United States Patent [19]

Hays

[11] Patent Number: 5,132,025
[45] Date of Patent: Jul. 21, 1992

[54] OIL WELL DRILLING MUD AND BRINE RECYCLING SYSTEM

[76] Inventor: Ricky A. Hays, P.O. Box 328, Weatherford, Okla. 73096-0328

[21] Appl. No.: 621,205

[22] Filed: Dec. 3, 1990

[51] Int. Cl.⁵ .................... C02F 1/72; C02F 3/04; B01D 21/26
[52] U.S. Cl. .................... 210/758; 166/265; 175/66; 175/206; 210/615; 210/705; 210/787; 210/804
[58] Field of Search ........... 210/769, 770, 665, 615, 210/713, 714, 705, 758, 804, 723, 702, 767, 749, 787; 175/66, 206, 728; 252/8.511, 8.513, 8.551, 8.51; 166/265, 267

[56] References Cited

U.S. PATENT DOCUMENTS

| | | | |
|---|---|---|---|
| 3,963,471 | 6/1976 | Hampton | 210/770 |
| 4,016,075 | 4/1977 | Wilkins | 210/714 |
| 4,040,958 | 8/1977 | Rammler | 210/770 |
| 4,151,096 | 4/1979 | Jackson | 166/305.1 |
| 4,429,535 | 2/1984 | Featherstone | 210/714 |
| 4,482,459 | 11/1984 | Shiver | 210/228 |
| 4,696,353 | 9/1987 | Elmquist et al. | 175/206 |
| 4,725,362 | 2/1988 | Dugat | 210/769 |
| 4,728,438 | 3/1988 | Featherstone et al. | 210/713 |
| 4,942,929 | 7/1990 | Malachosky et al. | 175/66 |
| 5,022,993 | 6/1991 | Williamson | 210/615 |

Primary Examiner—W. Gary Jones
Assistant Examiner—Sun Uk Kim
Attorney, Agent, or Firm—Robert K. Rhea

[57] ABSTRACT

A method of recycling or destroying the components of viscous oil well drilling mud and saltwater which includes reducing the mud to an aqueous slurry; separating and collecting the useable hydrocarbons from the slurry by evaporation or chemical action; injecting deleterious substances including saltwater into an environmentally approved injection well; and or forming fertilizer pellets from remaining dehydrated solids.

1 Claim, 10 Drawing Sheets

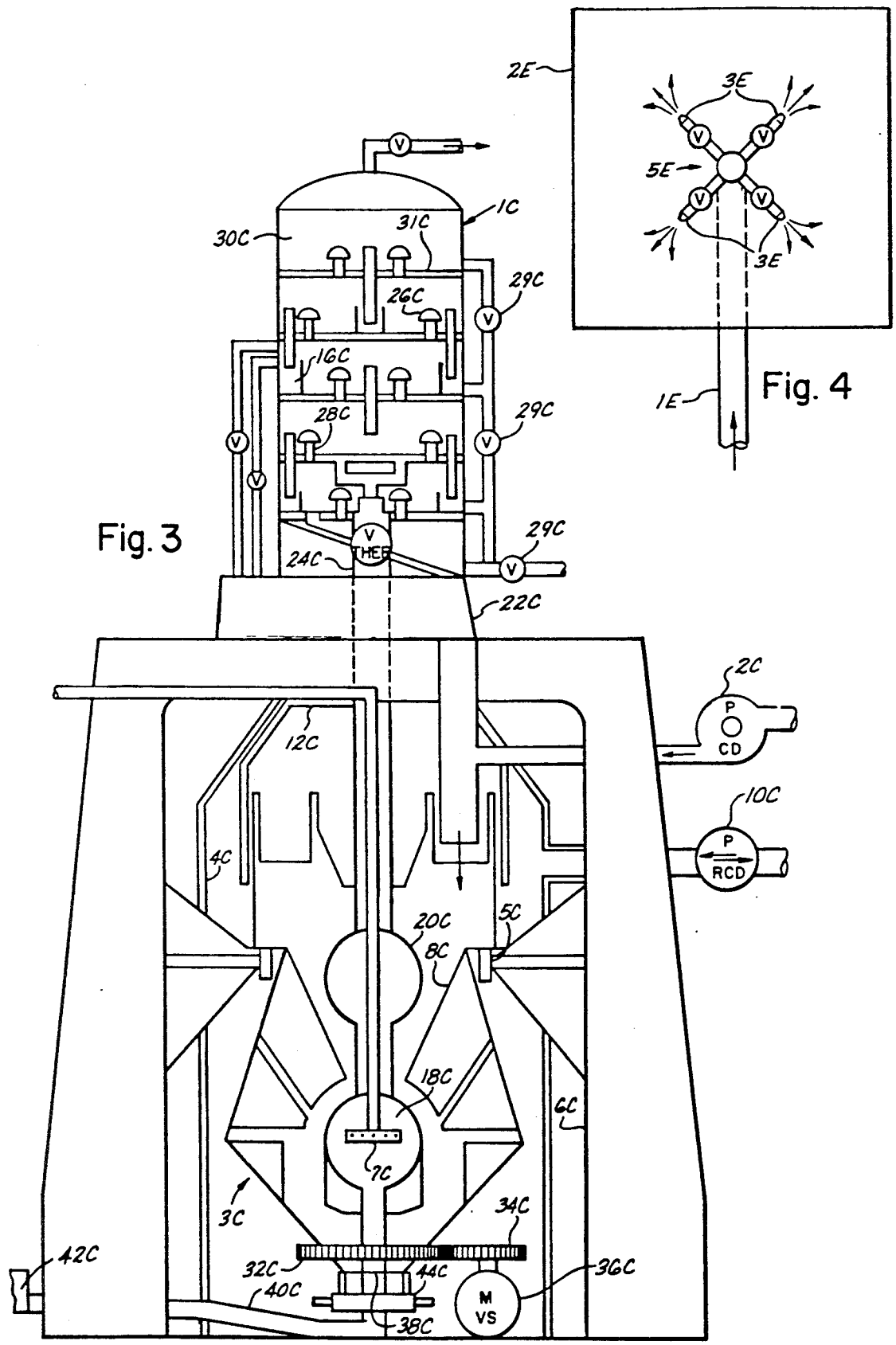

OIL WELL DRILLING MUD AND BRINE RECYCLING SYSTEM

BACKGROUND OF THE INVENTION

1. Field of the Invention

This invention relates to the oil and gas industry and more particularly to environmentally acceptable recycling drilling mud, brine and the by products thereof.

Oil and gas wells may be drilled in environmentally sensitive areas. One such area is that of bedrock aquifers and their recharge zones. Aquifers are strata or zones below the surface of the earth capable of producing water with human consumptive potential. The consumptive potential may be in the form of drinking water, or in the form of irrigation for agricultural crops.

Oil and gas well drilling mud, a suspension of generally aqueous fluid and emulsions, is used to seal off porous zones, and to counter-balance pressures encountered. Salt water including oil may be used as a vehicle instead of fresh water. The drilling mud usually consists of various substances in a finely divided state such as bentonite and barite.

Drilling mud carries the drill formation cuttings to the surface for disposal. Approximately two feet of oil well drilled footage requires one barrel of mud fluids. The drilling mud additives vary from region to region and from well to well. Since large and varying volumes of drilling fluids are needed to drill an oil well it is environmentally as well economically desirable to reuse, recycle or ultimately destroy these otherwise deleterious substances.

Oil and gas fields produce more and more salt water, herein called "brine". The brine consists of relative percentages of other economic units such as iodine, sodium bromide, sodium chloride, sodium iodide, calcium chloride, magnesium, potash, iron, potassium chloride, and aluminum. When brine is electrolyzed hydrogen gas ($H_2$) and chlorine gas ($CL_2$) are produced at the electrodes which can be reused and recycled. Brine may act as a contaminant to fresh water aquifers if not properly disposed of.

2. Description of the Prior Art

The most pertinent patent is believed to be U.S. Pat. No. 4,696,353 which discloses a mud cleaning system for recovering barite from drilling mud coming from an oil well, the mud being made up essentially of barite particles having a specific gravity of 4.2 or more, and a particle size mostly finer than 200 mesh, drill cuttings having a specific gravity of 2-3, and varying particle sizes ranging from about 200 mesh to one-half inch or more, and water. This system includes a first sieve bend, a second screen member in series therewith, and a spiral separator, in series with the screens. The sieve bend is provided with a vibrator and water sprays act in conjunction with the sieve bend and the second screen to aid in separation. The slurry leaving the spiral separator is screened to remove the ultra fines particles and the water is recycled. The system inherently washes potentially environmentally hazardous substances off the drill cuttings prior to their discharge from the system.

This invention is distinctive over this and other prior art patents by reducing drilling mud and brine to their respective elements which are useful in respective industries.

SUMMARY OF THE INVENTION

In accordance with the invention a drilling mud and brine reuse, recycling, or ultimate destruction of deleterious substances system and subsystems are provided which efficiently separates the fluids, cuttings and brine into economic units and/or reuses them as a fertilizer product or industrial gas byproduct.

This system and subsystem includes electrical and gas driven mechanical devices constructed or housed by non-corrosive materials.

The principal objective of this invention is to provide a method and system for reusing drilling mud and brine usable components and the destruction of deleterious substances.

BRIEF DESCRIPTION OF THE DRAWINGS

FIG. 3 is a mechanical diagram of a heater-treater distillate tower;

FIG. 4 is a mechanical diagram of the apparatus for dispersing drilling mud particles in land impoundment pits;

DESCRIPTION OF THE PREFERRED EMBODIMENTS

Figure 1A:
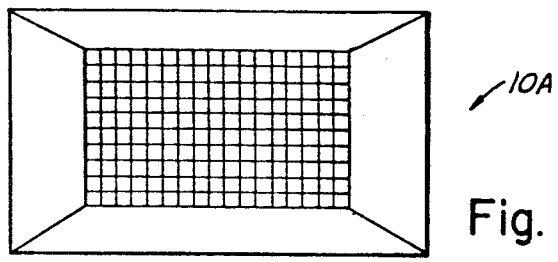
FIGS. 1A, 1B, and 1C are top, front and side mechanical diagram views, respectively, of a drilling mud and brine receiving manifold.

Like characters of reference designate like parts in those figures of the drawings in which they occur.

Figure 1B:
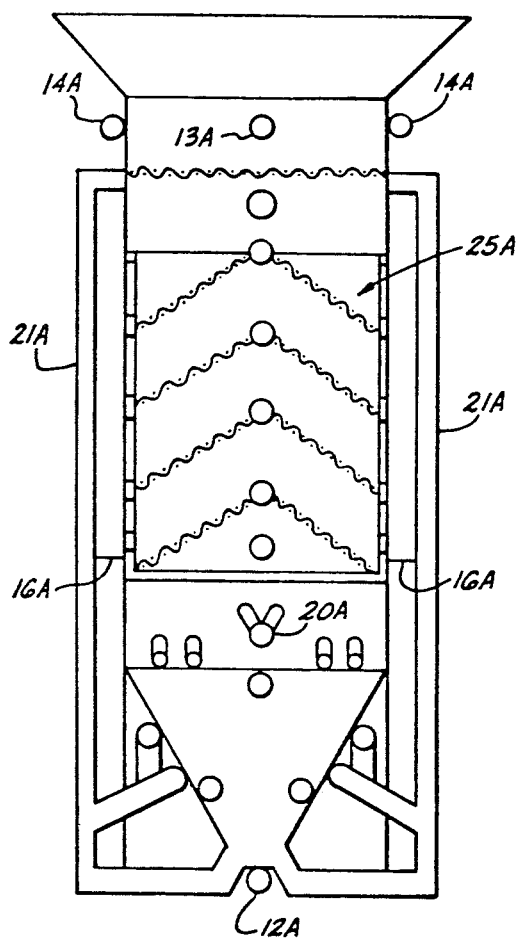
Figure 1C:
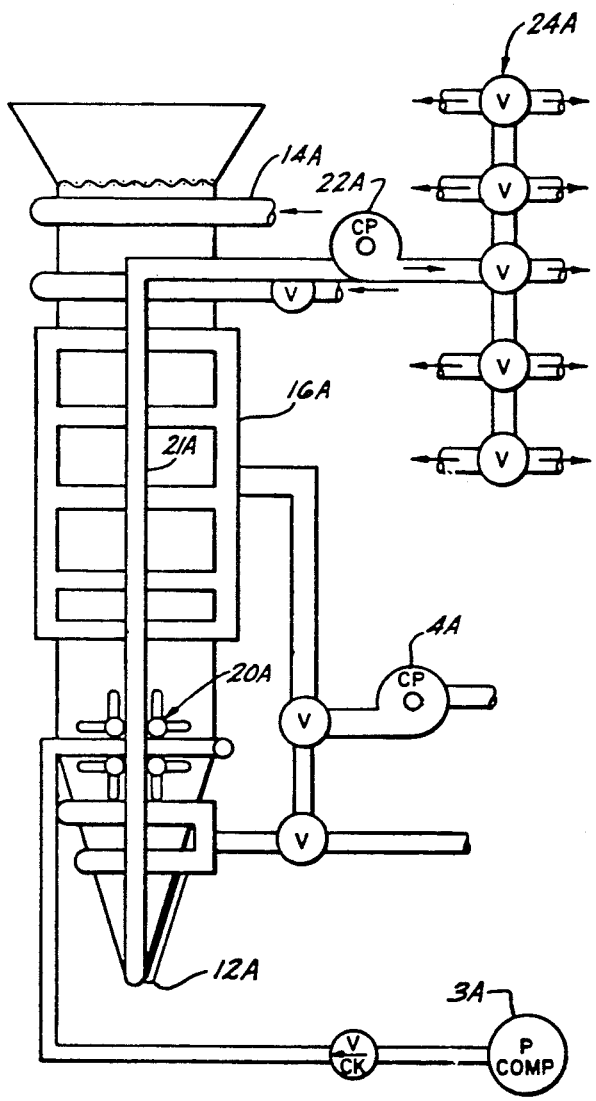

In the drawings:

Referring first to FIGS. 1A, 1B and 1C, the reference numeral 10A indicates a solids and fluids reduction manifold which receives drilling mud from a recently drilled well or a local State approved drilling mud impoundment pit, not shown. A water pump 4A provides the manifold 10A with a supply of water for agitation of the drilling mud and cuttings. An air compressor 3A provides compressed air for mud agitation by an air injector nozzle 20A. Water is also supplied from a fresh water aquifer to the top of an intake ring 16A at the vertex of a standard screen and sieve assembly 25A. The drilling mud is reduced to a slurry in the manifold 10A by adding air with the water under pressure for circulating and recirculating the slurry through the screen and sieve assembly 25A for removing solids having a diameter greater than 2.7 mm. A recirculation ring 14A provides a means for the recirculation of mud slurries and a continued reduction of its viscosity. A drain port 12A releases the mixture of fluids, solids, cuttings and brine. An inlet port 13A receives drilling mud slurry from other sources.

Drilling mud slurry and brine are drained from port 12A through a pipe 21A and manifold valves 24A to a centrifuge 1B (FIG. 2) by a pump 22A.

Figure 2:
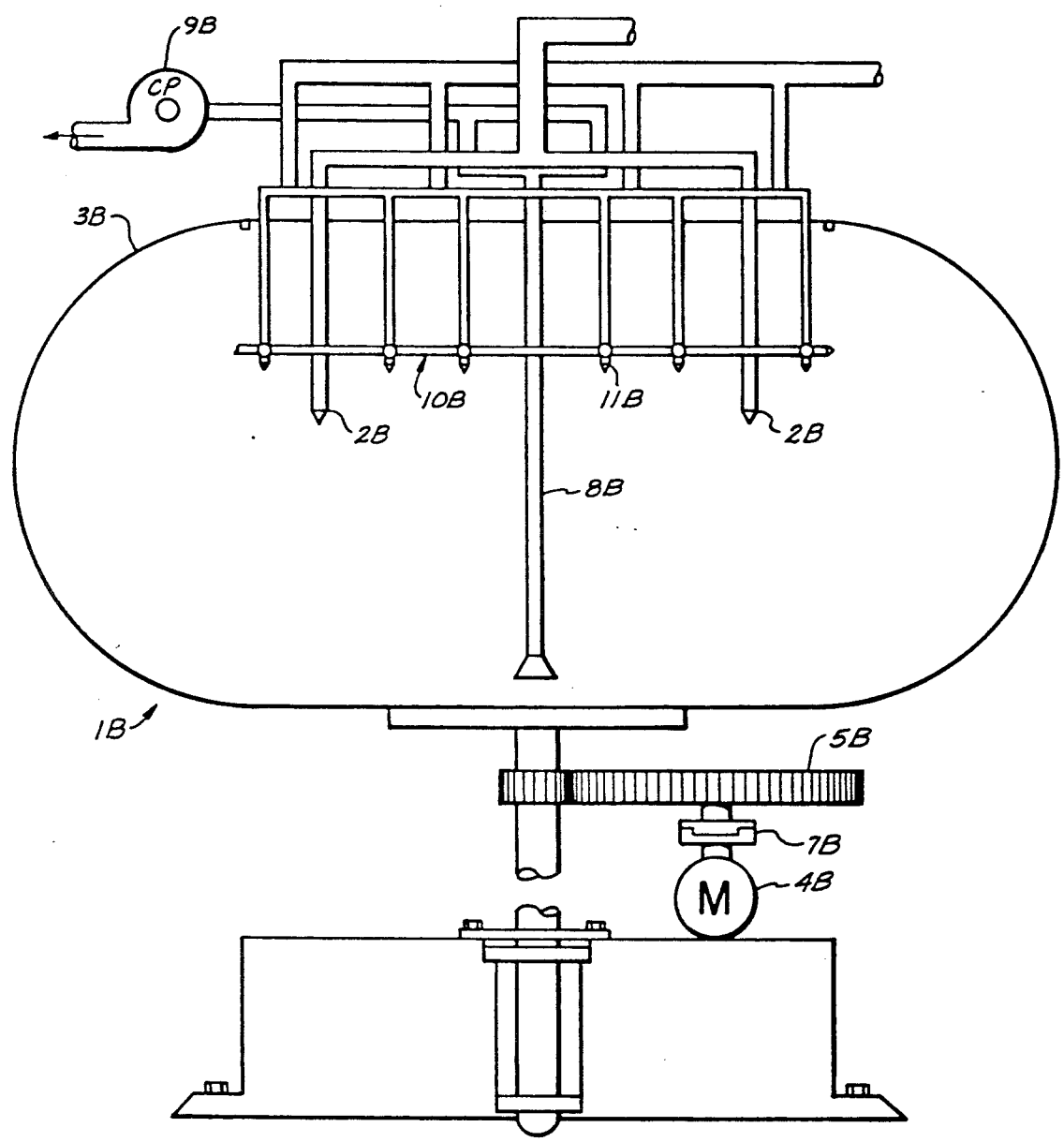
FIG. 2 is a mechanical diagram of a drilling mud component separating centrifuge.

Referring to FIG. 2, a centrifuge 1B receives mud slurries from the manifold 10A. The slurry is pump force injected by nozzles 2B into an angularly rotating rotor 3B with the rotor speed regulated by a variable speed motor which may be a hydraulic motor 4B. A clutch 7B interposed between the motor and rotor driving gears 5B protects the motor 4B if the rotor should seize. The centrifuge separates solids and liquids each from the other by a central vertical suction pipe 8B. The suction pipe 8B is connected with a pump 9B. Barite ($BsSO_4$) 4.2 $g/cm^3$ specific gravity or more; drill cuttings 3.0–2.0 $g/cm^3$ specific gravity; and aqueous sodium chloride (NaCl) 2.0 $g/cm^3$ or less are separated each from the other by varying the rpms of the rotor and are drawn from the spinning rotor through the suction pipe 8B while separated. A wash ring 10B horizontally surrounds the suction pipe 8B. The wash ring includes nozzles 11B for freeing the rotor 3B of clinging solids.

Referring to FIG. 3, a heater-treater distillate tower 1C having a retort 3C receives reduced and centrifuged slurries from the manifold 10A (FIG. 1) by a pump 2C. A vacuum chamber housing 4C, connected with a centrifuge vacuum pump 10C encases the retort 3C for conducting batch distillations at pressures of one centimeter of mercury or below. The retort 3C is supported on rollers 5C suspended from a carriage 6C. The heater-treater tower 1C includes a central heater 7C producing temperatures of 750° C. Methane gas ($CH_4$) can be used as a combustible fuel during the treatment of the slurry. Oxygen gas ($O_2$) is supplied from a source to assure a combustion temperature of 750° C. during the vacuum-heat treatment of the slurry batch. The retort 3C is rotated around the heating element 7C at variable revolutions per minute by gears 32C and 34C powered by a variable speed motor 36C for mixing and stirring the slurries by baffles 8C and exposing the slurry to the vacuum and heat. The retort is emptied through an exhaust port 38C into a chute 40C for recirculation to the manifold 10A (FIG. 1) by an auger or conveyer 42C. A removable exhaust port cover 44C seals the retort during operation.

A flue 12C on the heater-treater retort and distillation tower 1C receives vapors produced during the vacuum and heat treatment of the slurries which are circulated to the center 16C of the column housing and are repeatedly condensed and revaporized therein by counter currents. Gases exhausted from the heater 7C are circulated through flues from the heater burner 18C and the burner housing 20C through the base 22C of the tower for fractional distillation by counter currents therein. The burner flue enters the tower 1C at the center of the tower bottom 24C. Overhead products and bottom products are separated each from the other by counter currents flowing through bubble caps 26C with risers 28C six inches high.

The column 16C is divided into sections by horizontal partitions and each section is, respectively, drained of gases by valves 29C to a condenser, not shown. One section 30C of the tower having sufficient plates 31C to effectively separate volatile mixtures facilitates maximum fractional separation of the overhead from the bottom products.

Industrial electrochemical cells are employed during the operation of the system to produce hydrogen gas ($H_2$) at the cathode and chlorine gas ($Cl_2$) at the anode with sodium hydroxide (NaOH) produced as a by-product. Hydrogen gas ($H_2$) is circulated to product storage, or reuse. Chlorine gas ($Cl_2$) is circulated to product storage, reuse or ultimate destruction. Product sodium hydroxide (NaOH) is utilized as a packing for carbon dioxide ($CO_2$) filters.

Referring to FIG. 4, tubing means 1E receives drilling mud slurries from the manifold 10A (FIG. 1), centrifuge 1B (FIG. 2) and heater-treater tower 1C (FIG. 3) to disperse fine mud particles having a diameter of 2.7 mm or less and a chloride content of not more than 3,000 parts per million (ppm) into land impoundment pits 2E by systematically scattering particle drops having environmentally compatible specifications for land impoundment. Each land impoundment pit 2E having a fluid head means 5E in the center thereof equipped with four spray nozzles 3E directed toward the respective corner of a 0.404 hectare × 3.3 meter (212×212×10 ft.) pit. Each surrounding berms, not shown, sloped on a ratio of 3:1.

Figure 5:
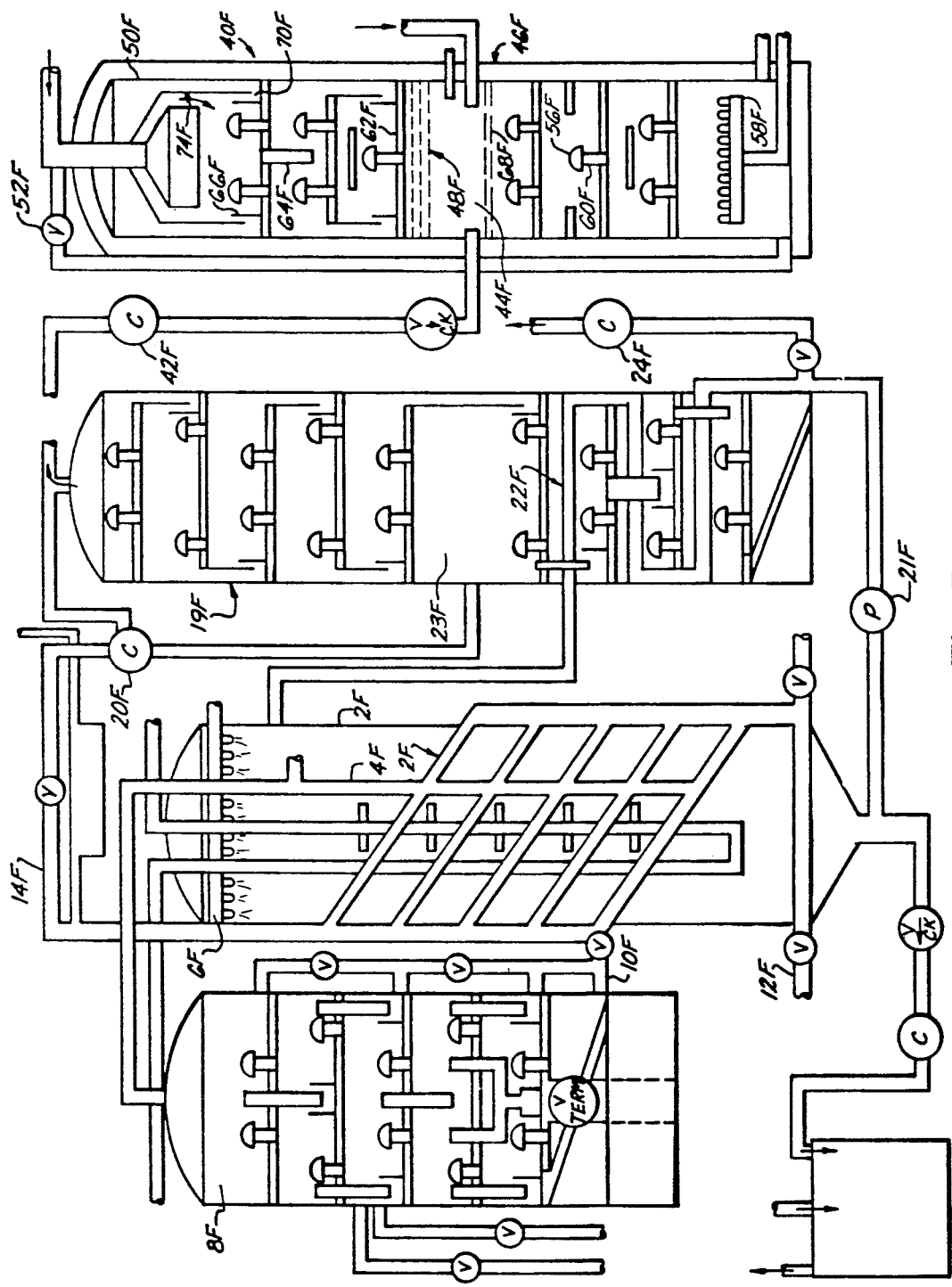
FIG. 5 is a mechanical diagram of a fractional distillation apparatus.

Referring to FIG. 5, a fractional distillation system 1F receives overhead vapors from the heater-treater tower 1C (FIG. 3) in a condenser 2F within heat-exchangers 4F in convection contact with a carbon dioxide ($CO_2$) system coolant and anti-contact freeze from a header 6F for condensing the vapors in the area 8F, distillate in the lines 10F and reflux and 12F, respectively. The vapors from the area 8F are piped to a first distillation column 19F; the distillate in the line 10F to a hydrocarbon separator of known industrial standards, not shown; and, the reflux in the line 12F to the retort 3C (FIG. 3) for revaporization. The overhead carbon dioxide gas ($CO_2$), carbon monoxide gas (CO) and oxides of nitrogen gas ($NO_x$) in the line 14F are transferred by a pump 20F under 80 atmospheres of pressure (atms) to the distillate column 19F. The carbon dioxide ($CO_2$) coolant and anti-freeze is circulated by pump 21F at 300 psig and 0° C. through heat exchangers 22F in the bottom portion of distillate column 19F. Carbon dioxide liquid ($CO_2$) is separated as a bottom product in the fractional distillation tower 19F and pumped to an insulated storage tank of 90% carbon dioxide liquid ($CO_2$) at 300 psig and 0° C. by a pump 24F. Carbon monoxide gas (CO) and oxides of nitrogen gas ($NO_x$) are bled off as overhead products from the column 19F area 23F at 71.2 atms of pressure and circulated by compressor pumps to a fractional distillation column, not shown, at 80 atms of pressure where nitrous oxide ($N_2O$) separates at 71.2 atms of pressure, nitric oxide (NO) separates at 64.0 atms of pressure, and carbon monoxide (CO) separates at 34.6 atms of pressure. Nitrogen dioxide ($NO_2$) with a critical pressure of 100 atms of pressure and a boiling point of 21.2° C. is not circulated in a liquid phase, but in the gaseous phase. The carbon monoxide gas (CO) bleeds at 34.6 atms of pressure and is transferred to storage. The oxides of nitrogen ($NO_x$) separate at 64.0 atms of pressure. The oxides of nitrogen ($NO_x$) at 60.0 atms of pressure are transferred by pump 42F and piping to the center 44F of a fractional distillation column 40F for nitric acid ($HNO_3$) formation, through a coolant jacket 46F containing a platinum/rhodium honeycomb catalyst 48F.

Ammonia (NH$_3$) and oxygen (O$_2$) is added from storage by pumps to the column 40F through the coolant jacket 46F and the platinum/rhodium honeycomb catalyst 48F. An inner sleeve 50F, coolant jacket 46F and, water/steam is circulated to control the exothermic reaction at 1000° C. for nitric acid (NHO$_3$) formation. A two-way pump 52F lifts unreacted and reacted bottom material to the column top to trickle through the counter currents to the column bottom. The pump 52F moves unreacted nitric oxide (NO) from the top of the column in sequence modes, and aerates the column bottoms, by the nitric oxide rising through bubble caps 56F from the aerator 58F, repeatedly vaporizing and condensing in a boiling mass until the heat of the reaction has dissipated. Risers 60F six inches high trap fluids on the surface plate 62F for contact with the liquid and vapor phases of the mixtures. Pipes 64F provide a means for the liquid to flow to the column bottom for nitric acid accumulation. Weirs 66F, perforated plates 68F, and inlet 70F of the weirs are utilized in conjunction with a sufficient number of plates to effectively create the desired results. Water (H$_2$O) indicated by the arrow 74F is sprayed into the column as needed to facilitate the reaction. The distillate nitric acid (NHO$_3$) is pumped to storage. A catalytic converter 80F of platinum/palladium/rhodium in the top of condenser 2F absorbs overhead vapors of carbon dioxide (CO$_2$) and nitrogen (N$_2$) from the gas area 8F for the formation of urea.

Figures 6A, 6B:
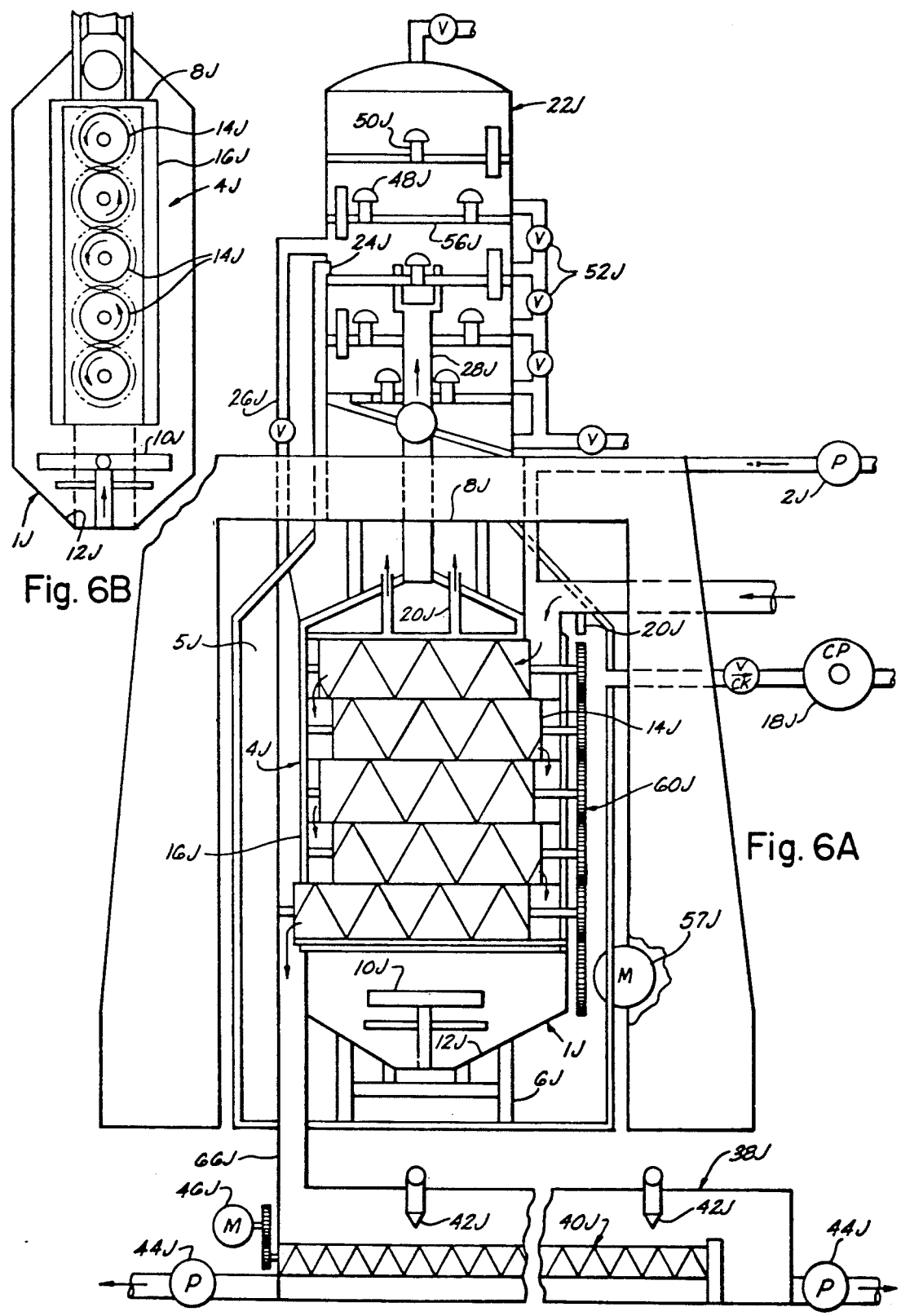
FIGS. 6A and 6B are fragmentary front and side mechanical diagram views, respectively, of a drilling mud distillate and drying tower.

Referring to FIG. 6, a slurry dryer and distillate tower 1J, having a vacuum chamber 5J surrounding a hopper 4J receives drilling mud slurries from the manifold 10A (FIG. 1) by a pump 2J.

The hopper 4J is supported by a frame 6J reenforced by top beams 8J. The hopper 4J includes a central heater 10J near the base 12J of the hopper housing. Methane gas (CH$_4$) may be used for the heater 10J fuel. Oxygen gas (O$_2$) is used to increase the temperature to 1000° C. during the vacuum-heat treatment. Superposed augers 14J parallel with the heater 10J move the slurry horizontally back and forth through the heat at variable revolutions per minute (rpm) mixing and stirring the slurry in the auger housing 16J and exposing the slurry to the 1000° C. heat of the heater. A motor 57J and gear assembly 60J on the ends of the auger drive shafts rotate the augers in respective opposing directions for transporting the slurry through the hopper 4J within the housings 16J. A drain pipe 66J empties the dehydrated mud from the hopper 4J into a tank 38J for continued processing. Reflux is circulated through the fluids and solids dryer and distillate tower 1J vaporizing and condensing the volatile hydrocarbons and other impurities from the drill slurries. The vacuum chamber 5J connected with a vacuum pump 18J provides a pressure of one centimeter of mercury. Flues 20J communicating with the dryer hopper 4J and bottom of the distillate tower 22J receive vapors and gases from the pipes 26J and 28J, respectively, emitted by the vacuum and heat treatment of the drill slurries in the hopper 4J which are returned to the center 24J of the tower housing and are repeatedly condensed and revaporized. Overhead and bottom products are separated each from the other by counter currents flowing through bubble caps 48J having risers 50J six inches high in the tower 22J. Each section of the tower 22J is drained to a condenser, not shown, by valves 52J. One section 54J of the tower facilitates maximum fractional separation of the overhead from the bottom products by plates 56J separating volatile mixtures therein.

The tank 38J is connected with the manifold 10A (FIG. 1) and maintains a predetermined flow of drilling mud slurry through the dryer to assist in retaining the vacuum within the vacuum chamber 5J. An auger 40J in the tank 38J, driven by a motor 46J, moves the dehydrated slurry longitudinally while water from jets 42J reliquify the drilling mud. Pumps 44J drain to the manifold 10A (FIG. 1) or a pre-tank 1R (FIG. 11) as presently described.

Figure 7:
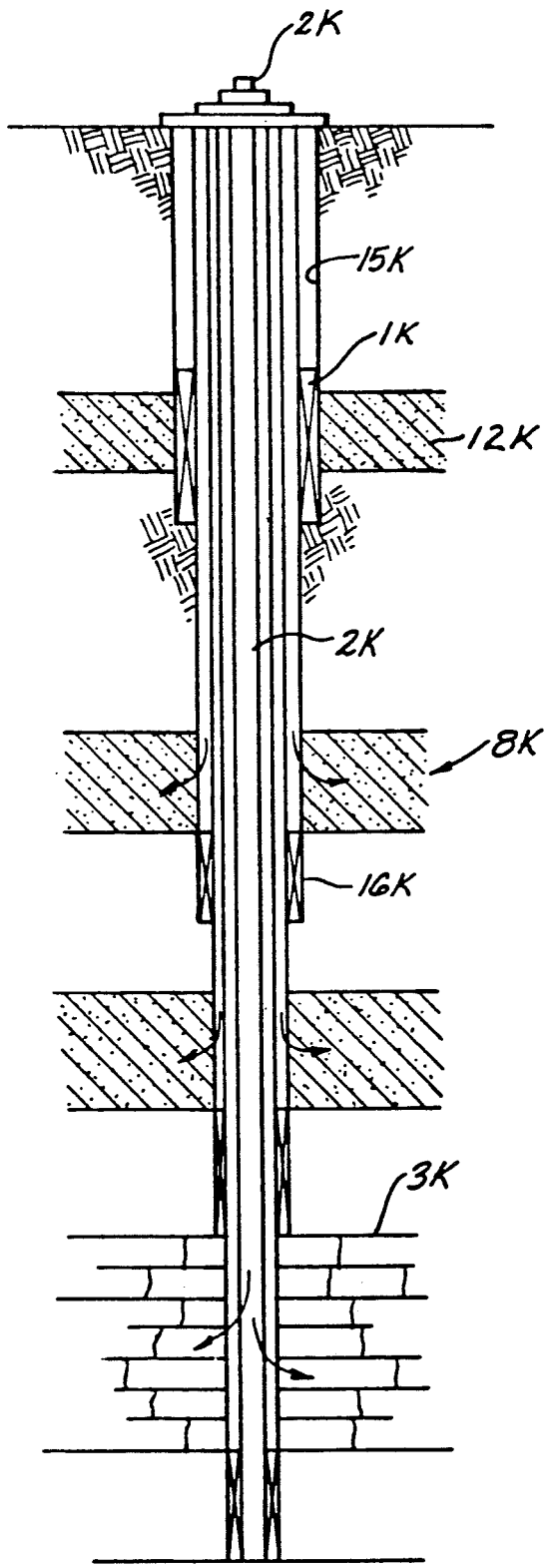
FIG. 7 is a diagrammatic cross sectional view of a deleterious substance disposal well.

Referring to FIG. 7, a disposal well 15K receives deleterious substances below a ground water seal 1K. Hydrochloric acid (HCl) is injected by a tube 2K into a limestone (CaCO$_3$) formation 3K forming calcium chloride (CaCl$_2$) therein and destroying chlorine gas (Cl$_2$) Carbon dioxide gas (CO$_2$) and hydrogen gas (H$_2$) are produced by injecting hydrochloric acid (HCl) into the limestone 3K and used for the synthesis of methane gas (CH$_4$) as presently explained. Brine from the manifold 10A and other apparatus of the system (FIG. 1) is injected into alternate disposal zones 8K, sealed as at 16K from the ground water aquifer 12K.

Figure 8:
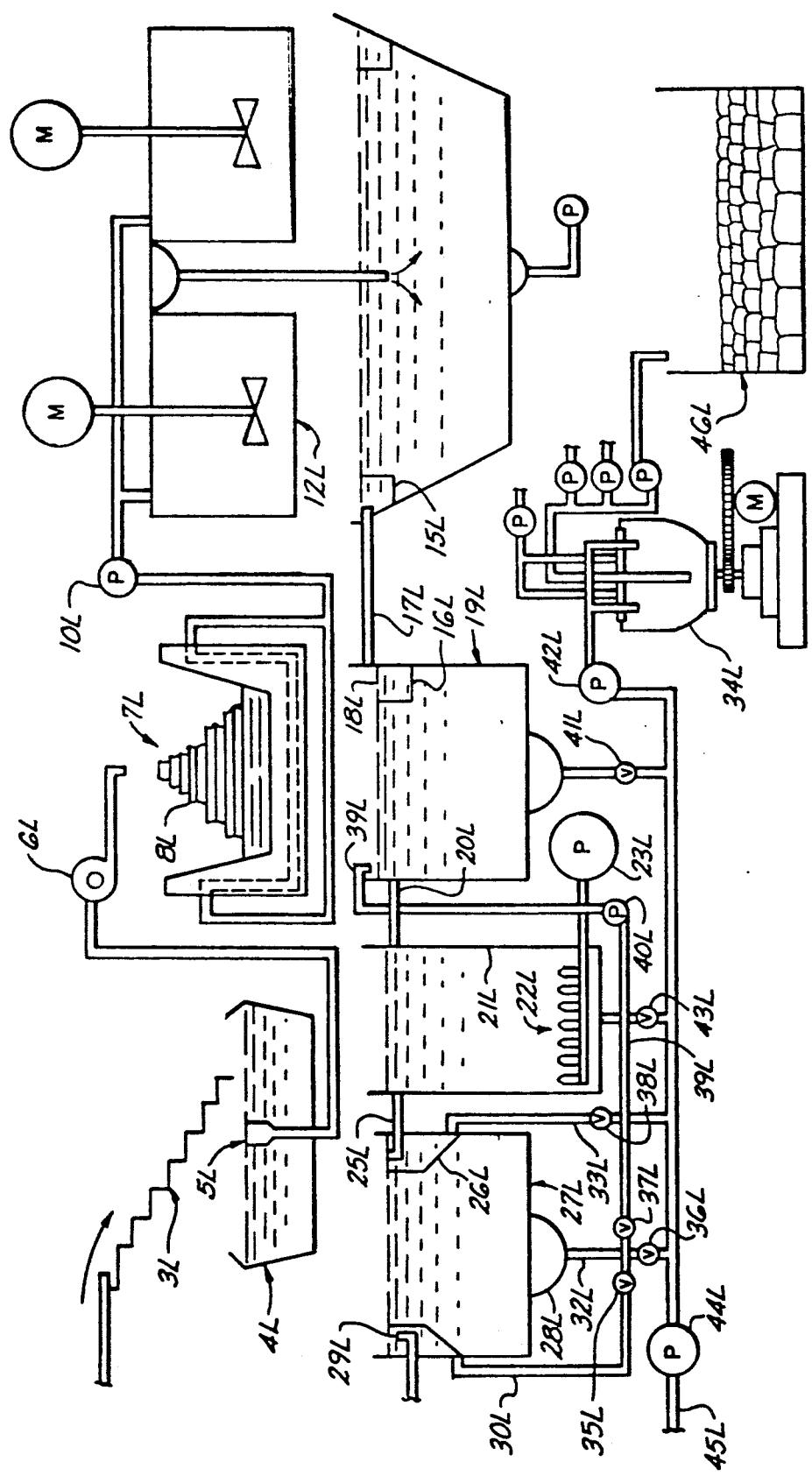
FIG. 8 is a mechanical diagram of a salt water processing apparatus.

Referring to FIG. 8, brine from the manifold 10A (FIG. 1) or centrifuge (FIG. 2) is trickled down a step aerator 3L for exposure to oxygen and collected in a sedimentation tank 4L where oxidized iron (Fe) in the brine settles to the bottom. An overflow drain 5L connected with a pump 6L sprays the brine on a trickle filter 7L having a microbial growth 8L which converts organic materials in the brine and emits carbon dioxide gas (CO$_2$). A pump 10L drains the filtered brine and transfers it to a flocculator 12L. An overflow port communicating with a thickener (Mg(OH)$_2$) receives spent brine flowing over weir 15L, to weir 16L through leveling tube 17L. Overflow 18L communicating with sedimentation tank 19L receives spent brine; and tube 20L communicating with aeration tank 21L transports overflow from tank 19L to tank 21L having an air agitation means 22L and an air pump 23L. Clarified brine flows through a leveling tube 25L into weir 26L where residue settles to the bottom. Clarified brine flows over weir 26L into sedimentation tank 27L where residue settles to the tank bottom 28L. Clarified brine flows over weir 29L into pipe 30L. Pipe 30L communicates with electrochemical cells, not shown, for the electrolysis of clarified brine. Pipes 30L, 32L and 33L communicate with centrifuge 34L through valves 35L, 36L and 38L interposed in the respective pipe. Recirculation pipe 39L communicates with tank 19L, pump 40L and valves 35L, 36L, 37L and 38L. Sedimentation tank 19L communicates with centrifuge 34L through valve 41L and pump 42L. Sedimentation tank 19L, aeration tank 21L, and sedimentation tank 27L communicate with centrifuge 34L through pump 42L and valves 35L, 36L, 37L, 38L, 41L and 43L. Pump 44L supplies the electrochemical cells by pipe 45L. Centrifuge 34L discharges brine residue to contact filter bed 46L. Contact filter bed 46L is formed by stone and slate with microbial growth, not shown.

Figure 9:
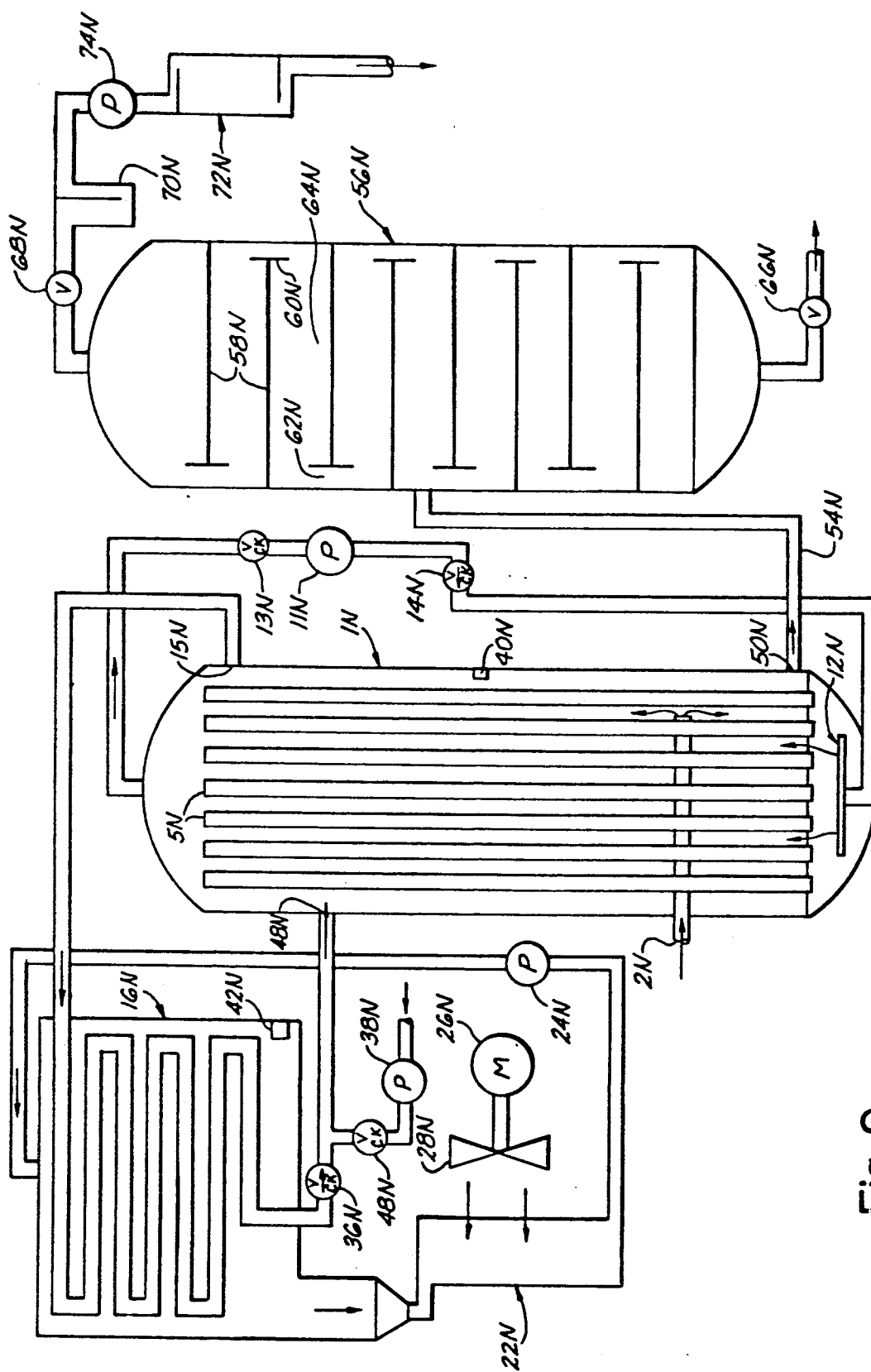
FIG. 9 is a mechanical diagram of a methane gas formation cell.

Referring to FIG. 9, an exothermic nickel (Ni) catalyst methane (CH$_4$) formation cell 1N through an inlet 2N receives hydrogen gas (H$_2$) and carbon dioxide (CO$_2$) from the disposal well 15K and water (H$_2$O) in contact with nickel catalyst plates 5N. In the exothermic reaction methane gas (CH$_4$), oxygen gas (O$_2$) and water-steam (H$_2$O) gases ascend the cell 1N as an overhead product and are pumped by a pump 11N to an injector 12N. Check valves 13N and 14N control the cell 1N back-pressure. Heat exchanger 16N receives the overhead gases. Coolant is circulated through a radiator 22N by a pump 24N. An electric motor 26N drives a fan 28N blowing air through the radiator to cool the coolant. Check valve 36N also controls back pressure from cell 1N and check valve 48N controls back pressure against pump 38N. Pumps 11N, 24N and 38N are controlled by a thermostat 40N. The electric motor 26N and pump 24N are controlled by a heat exchanger second thermostat 42N. The thermostat 40N controls the reaction heat of cell 1N and thermostat 42N controls the temperature of the coolant. Feed gases flow into cell 1N inlet 48N in communication with outlet port 15N. Pump 11N and water pump 38N produces water pressure at outlet 50N for circulating methane gas ($CH_4$) and water by a pipe 54N to inlet 52N of cell 56N. Cell 1N bottom product is thus injected into cell 56N through inlet 52N where counter currents separate overhead methane gas ($CH_4$) from bottom product water. The overhead and bottom products are separated each from the other by counter currents flowing through perforated baffles 58N, weir 60N and down passageways 62N. Weir 60N is six inches high. A section 64N of cell 56N provides the maximum separation of the overhead and the bottom products. Cell 56N having sufficient baffles 58N to efficiently separate the mixtures therein. The bottom product water is bled off through valve 66N to sedimentation tank 27L (FIG. 8). Overhead methane gas ($CH_4$) is bled off through check valve 68N and circulated through a sodium hydroxide prefilter 70N and a sodium hydroxide after filter 72N for water vapor removal from the methane gas fed by pump 74N operating at 50 atms methane liquification pressure for product storage. Sodium hydroxide for filter 70N and 72N is obtained as a byproduct from a hydrochloric acid formation cell (FIG. 10), as will now be described.

Figure 10:
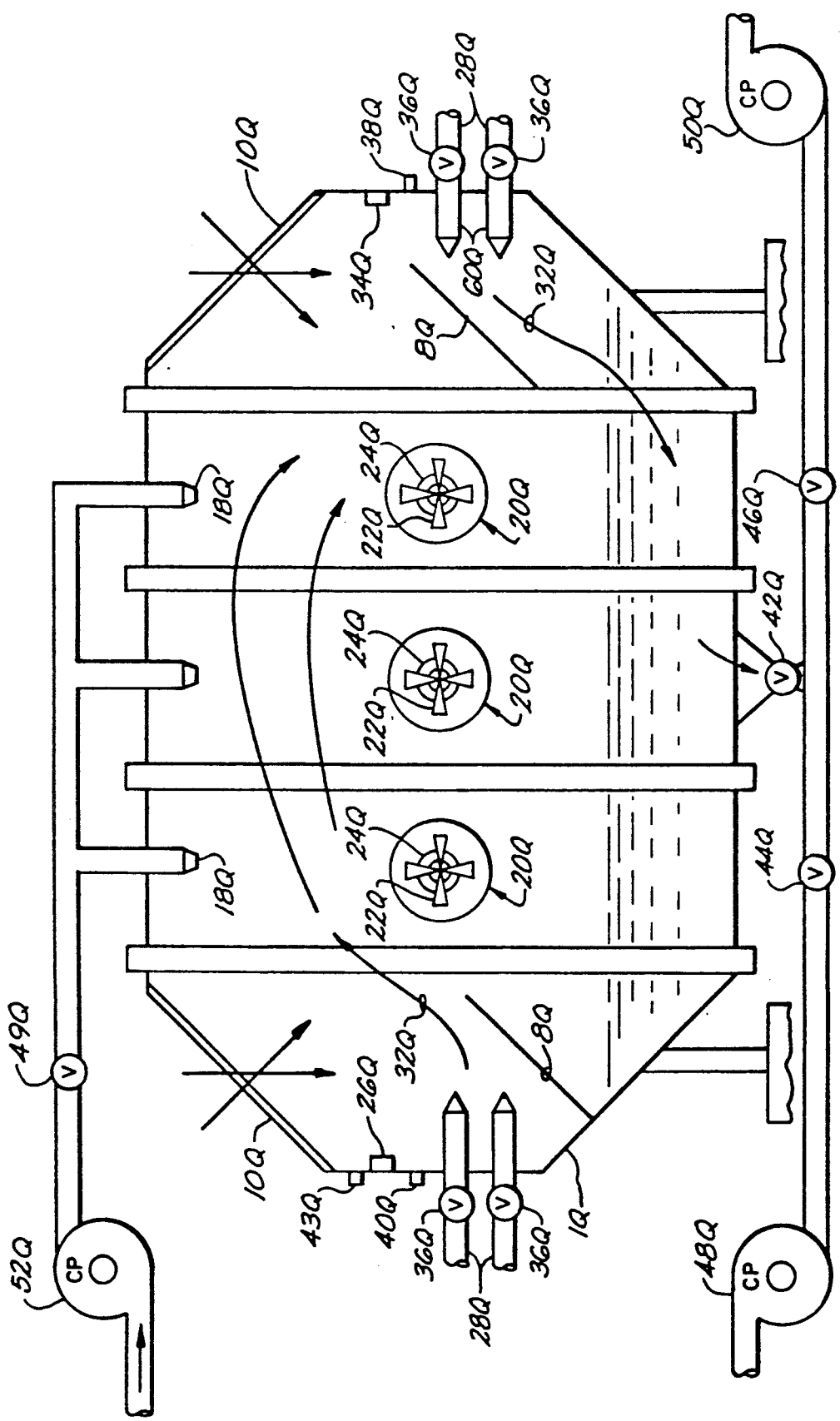
FIG. 10 is a mechanical diagram of a hydrochloric acid formation cell.

Referring to FIG. 10, hydrochloric acid cell 1Q receives hydrogen gas ($H_2$) and chlorine gas ($Cl_2$) through magnetic valve operated nozzles 6Q communicating with an electrochemical cell which produces hydrogen gas ($H_2$) and chlorine gas ($Cl_2$). Deflectors 8Q divert gases into contact with glass plates 10Q. The glass plates 10Q permit sunlight to act as an energy source initiating a reaction forming hydrochloric acid (HCl).

Water nozzles 18Q provide a means to hasten the reaction which evolves 22Kcal of heat per gram mole of hydrochloric acid (HCl). Nozzles 18Q dissolve hydrogen chloride gas (HCl) in water 28-36 percent by volume. The solubility of the gases is less at higher temperatures. Eighty percent reacts in ten minutes at 450° C. and the compound is stable, being only 0.2 percent decomposed at 1,550° C. Heat exchangers 20Q extract heat produced when the gases dissolve in the water. The heat exchangers are equipped with fans 22Q and motors 24Q controlled by a thermostat 26Q.

The fans are disposed at one end of heat exchanger tubes 28Q to force cool air through the tubes. Hot air in the direction of the arrow 32Q is exhausted at the opposite end of tubes 28Q. The motors 24Q are activated simultaneously or independently for extracting heat from any part of the cell 1Q to maintain a reaction temperature of 250° C. to 450° C. Thermostat 34Q closes magnetic valves 36Q at 500° C. interrupting the hydrogen gas ($H_2$) and chlorine gas ($Cl_2$) supplied to cell 1Q and the reaction in the cell decays. Circuit breaker 38Q must then be reset to restart the operation of cell 1Q. Reset button 40Q opens valve 42Q to drain the cell 1Q and reset button 43Q opens or closes valves 44Q or 46Q. Pump 48Q and valve 44Q are on the same circuit; pump 50Q and valve 46Q are on the same circuit; and, at the end of the draining of cell 1Q, valve 49Q opens and water pump 52Q fills cell 1Q to one-third of its capacity. Reset button 40Q opens valves 36Q during the initial phase of pumps 48Q and 50Q. Each reset circuit acts as a security system on the reaction and draining of the hydrochloric acid (HCl) in cell 1Q. Pump 50Q communicates with the well 15K (FIG. 7) and pump 48Q communicates with aluminum storage tanks, not shown.

Figure 11C:
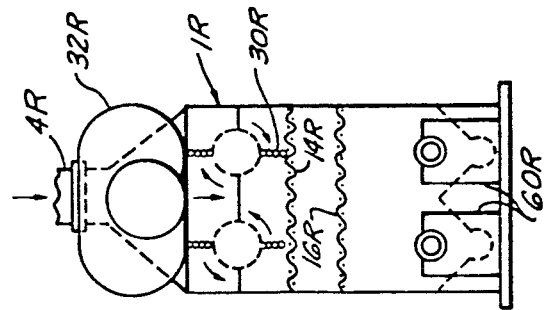
FIGS. 11A, 11B and 11C are top, side and right end mechanical diagram views, respectively, of a drilling mud component receiving tank.
Figure 11A:
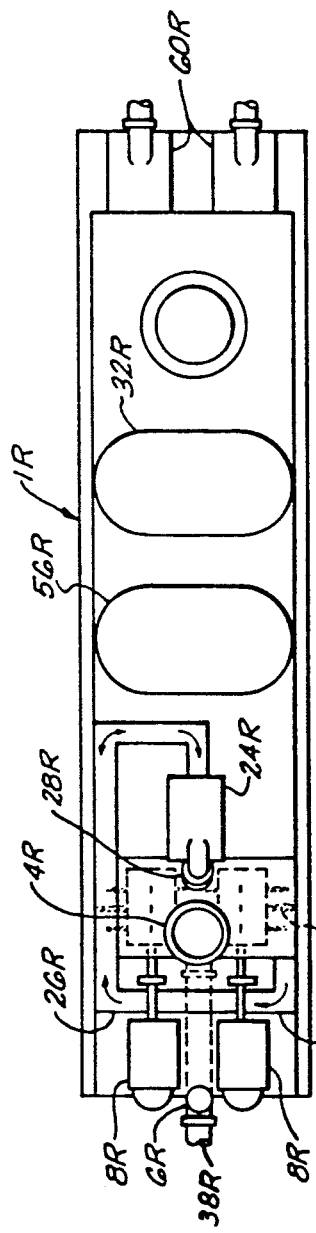
Figure 11B:
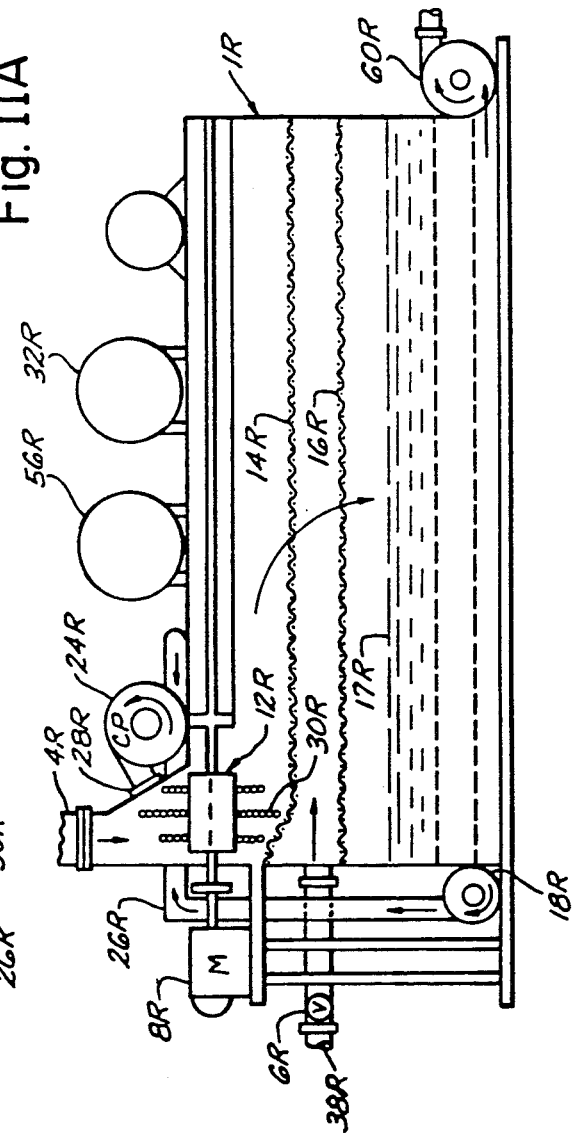

Referring to FIG. 11, a pre-tank 1R constructed in part from non-corrosive material such as aluminum receives dehydrated drilling mud solids from the tank 38J (FIG. 6) through inlet 4R with hydrochloric acid from cell 1Q (FIG. 10) injected through valve 6R. Motor 8R drives beaters 12R and the beaters pulverize dehydrated solids from inlet 4R. One-half inch mesh screen 14R and one-fourth inch mesh screen 16R make a sharp separation of particles. Particles smaller than one-fourth inch drop into hydrochloric acid (HCl). Pump 18R circulates the slurry to pump 24R through pipe 26R injecting the hydrochloric acid (HCl) slurry into the incoming processed drilling mud from the conveyor 42C (FIG. 3) and the tank 38J (FIG. 6) at 28R. The beaters 12R, formed by chain members 30R, pulverize solids in the mixture entering at 28R which drops to screen 14R dissolving and reducing particles of less than one-fourth inch mesh which fall into the hydrochloric acid slurry in the bottom of pre-tank 1R having a capacity to process 480 barrels. The slurry is circulated and recirculated until all of the carbon dioxide gas producing vehicles in the drilling fluids are reacted. Vacuum tank 32R is vacuum pump evacuated through filters to inlet port 38R. Carbon dioxide gas is drawn out of pre-tank 1R by the vacuum in tank 32R. Carbon dioxide gas remaining in pre-tank 1R is pumped into tank 32R until full. If carbon dioxide gas ($CO_2$) is still present in pre-tank 1R tank 32R is emptied to the distillation system 1F (FIG. 5). Tank 32R is reevacuated and the process repeated.

The slurry is recirculated in pre-tank 1R. Nitric acid ($NaNO_3$) is injected into the mixture and circulated until reacted. Tank 56R is evacuated and with tank 56R under vacuum and chlorine gas ($Cl_2$) and nitrosyl chlorine gas (NOCl) are evacuated from pre-tank 1R. The process is repeated to draw excess $Cl_2NOCl$ from pre-tank 1R until chlorine gas ($CL_2$) is the only byproduct remaining from the $Cl_2NOCl$ cycle. Chlorine gas ($Cl_2$) is then transferred to the hydrochloric acid formation cell 1Q (FIG. 10) from tank 56R. The sodium nitrate slurry ($NaNO_3$) is recirculated in pre-tank 1R. Secondary and micro nutrients, not shown, are injected into the circulating slurry, mixed, stirred and agitated. Pump 60R provides a means for the sodium nitrate ($NaNO_3$) slurry to be circulated to a pellet template for the formation of sodium nitrate ($NaNO_3$) fertilizer pellets of industry standard sizes.

Figure 12:
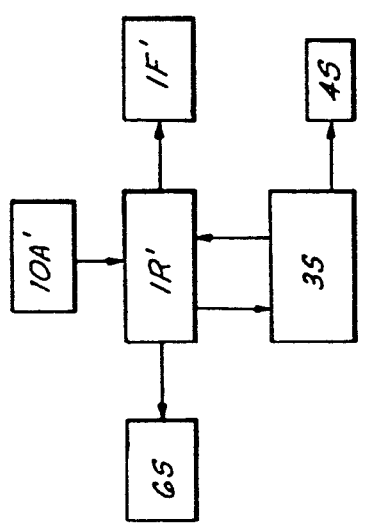
FIG. 12 is a flow diagram of the manner of destruction of chloride contaminated drilling mud fluid.

Referring to FIG. 12, a sodium nitrate fertilizer subsystem 1P provides a means for the ultimate destruction of high chloride (NaCl) contaminated drilling fluids and cuttings. Chloride levels greater than 10,000 parts per million (ppm) are not environmentally acceptable for land impoundment techniques. Such contaminated drilling mud and cuttings are off-loaded to a manifold 10A' and reduced to a slurry and screened as demanifold scribed hereinabove to have particles sizes less than 2.7 mm. This slurry is pumped to pre-tank 1R' and hydrochloric acid (HCl) is added. The hydrochloric acid (HCl) is mixed with the slurry and, the off-gas carbon dioxide ($CO_2$) is transferred to a fractional distillation system 1F'. Nitric acid is added to pre-tank 1R' and mixed and stirred with the slurry. Off-gases chlorine ($Cl_2$) and nitrosyl chloride (NOCl) with water vapors are passed to fractional distillation column 3S where overhead chlorine gas ($Cl_2$) and nitrosyl chloride gas (NOCl) are returned to the pre-tank 1R'. The bottom product water is drawn off to an evaporation tank 4S. Excess chlorine gas ($Cl_2$) from the $Cl_2$-NOCl cycle is utilized in the formation of fertilizer pellets (FIG. 11).

Secondary and micro nutrients, not shown, are transferred to the pre-tank 1R (FIG. 11) mixed, stirred and blended into the sodium nitrate slurry and transferred to a fertilizer pellet template 6S.

Referring again to FIGS. 3 and 6, a process for the degrading of hydrocarbon vehicles is by exploitation of microbial organism. Biotechnology techniques as the control of living organisms to act as factories or de novo material processes for bioremediation of vehicles offers an effective alternative to the vacuum-heat treatment of hydrocarbon vehicles. Microbial organisms degrade waste streams. Bacteria or fungi can be utilized to clean-up aquifers, toxic dumps and oil spills. Recombinant DNA technology can enhance the in situ tasks that would otherwise be too costly for conventional waste stream disposal technology. Microbial communities and mechanical apparatus may be employed in conjunction to remedy special tasks.

A process for sodium nitrate ($NaNO_3$) fertilizer formation is by the reaction of nitric acid ($HNO_3$) (FIG. 5), and sodium hydroxide (NaOH) produced during the electrolysis of brine: $HNO_3 + NaOH \rightarrow NaNO_3 + H_2O$. Mechanical reactors (FIG. 6) are employed to carry out the process.

Referring to FIG. 8, the clarification of brine in the filtration process can be enhanced through the calcination of dolomite ($CaCO_3 \cdot MgCO_3$) in which the reactions involved are:

1) $CaCO_3 \cdot MgCO_3 + Heat \rightarrow CaO + 2CO_2 \uparrow$
2a) $CaO + MgO + 2H_2O$ 2b) $6H_2 + 2CO_2 \xrightarrow[\text{catalyst}]{\text{Nickel}} 2CH_4 + 2H_2O$ 3) $Ca(OH)_2 + MgCl_2 \rightarrow CaCl_2 + Mg(OH)_2$
4) $Ca(OH)_2 + Mg(OH)_2 + MgCl_2 \rightarrow CaCl_2 + 2Mg(OH)_2$ Reaction (1) describes the calcination of dolomite. Reaction (2a) illustrates the preparation of milk of dolomite by hydration. Reaction (2b) represents methane gas ($CH_4$) formation (FIG. 9) from the carbon dioxide gas ($CO_2$) byproduct of reaction (1). Reaction (3) represents the action of the calcium hydroxide ($Ca(OH)_2$) in the milk of dolomite on magnesium chloride ($MgCl_2$) in the brine. Reaction (4) describes the sum exchange when milk of dolomite is blended to brine containing magnesium chloride ($MgCl_2$) The magnesium hydroxide ($Mg(OH)_2$) is the sum produced from the brine and the dolomite. The reaction (2b) water ($2H_2O$) byproduct, and the residual brine are in a condition for suitable subsurface disposal (FIG. 7) or by further conditioning (FIG. 8) to render it so or by electrolysis.

Referring to FIGS. 2 and 8, a process of centrifuge separation and filtration is with ion-permeable membrane for the extraction of heavy metals from drilling mud and its cuttings. The heavy metals may be zinc (Zn) and chromium (Cr) used for hydrogen sulfide gas ($H_2S$) control.

Obviously the invention is susceptible to changes or alterations without defeating its practicability. Therefore, I do not wish to be confined to the preferred embodiment shown in the drawings and described herein.

I claim:
1. A method of recycling brine separated from oil well drilling mud comprising the steps of:
   a) centrifuge separating brine from drilling mud solids;
   b) aerating the brine by progressively trickling it down a series of descending steps for oxidizing iron;
   c) collecting the brine in a sedimentation tank;
   d) converting organic matter in the brine to carbon dioxide gas by spraying the brine on a trickle filter containing microbial solid matter growth;
   e) transferring the brine to a flocculator; and,
   f) clarifying the brine by adding magnesium hydroxide thereto.

* * * * *